US010282638B2

(12) United States Patent
Sun et al.

(10) Patent No.: US 10,282,638 B2
(45) Date of Patent: May 7, 2019

(54) TRACKING FOR DETECTION OF TEE PROBE IN FLUOROSCOPY MEDICAL IMAGING

(71) Applicants: Siemens Healthcare GmbH, Erlangen (DE); Siemens Medical Solutions USA, Inc., Malvern, PA (US)

(72) Inventors: Shanhui Sun, Plainsboro, NJ (US); Tobias Heimann, Erlangen (DE); Shun Miao, Princeton, NJ (US); Rui Liao, West Windsor Township, NJ (US); Terrence Chen, Princeton, NJ (US)

(73) Assignee: Siemens Healthcare GmbH, Erlangen (DE)

( * ) Notice: Subject to any disclaimer, the term of this patent is extended or adjusted under 35 U.S.C. 154(b) by 234 days.

(21) Appl. No.: 15/217,014

(22) Filed: Jul. 22, 2016

(65) Prior Publication Data
US 2017/0032512 A1     Feb. 2, 2017

Related U.S. Application Data

(60) Provisional application No. 62/198,524, filed on Jul. 29, 2015.

(51) Int. Cl.
G06K 9/62      (2006.01)
G06K 9/46      (2006.01)
G06T 7/73      (2017.01)

(52) U.S. Cl.
CPC ........ *G06K 9/6267* (2013.01); *G06K 9/4614* (2013.01); *G06K 9/6203* (2013.01);
(Continued)

(58) Field of Classification Search
CPC .. G06K 9/6267; G06K 9/6256; G06K 9/6203; G06K 9/4614; G06K 9/6277; G06K 2209/057; G06T 7/74; G06T 2207/10016; G06T 2207/30092; G06T 2207/20081; G06T 2207/10064
(Continued)

(56) References Cited

U.S. PATENT DOCUMENTS

2007/0122001 A1*   5/2007   Wang ................. G06K 9/00208
                                                     382/103
2012/0296202 A1    11/2012  Mountney et al.
(Continued)

OTHER PUBLICATIONS

Mountney, Peter, et al. "Ultrasound and fluoroscopic images fusion by autonomous ultrasound probe detection." International Conference on Medical Image Computing and Computer-Assisted Intervention. Springer Berlin Heidelberg, 2012.
(Continued)

*Primary Examiner* — Amandeep Saini

(57) ABSTRACT

A probe pose is detected in fluoroscopy medical imaging. The pose of the probe through a sequence of fluoroscopic images is detected. The detection relies on an inference framework for visual tracking overtime. By applying visual tracking, the pose through the sequence is consistent or the pose at one time guides the detection of the probe at another time. Single frame drop-out of detection may be avoided. Verification using detection of the tip of the probe and/or weighting of possible detections by separate detection of markers on the probe may further improve the accuracy.

13 Claims, 6 Drawing Sheets

(52) U.S. Cl.
CPC ......... *G06K 9/6256* (2013.01); *G06K 9/6277* (2013.01); *G06T 7/74* (2017.01); *G06K 2209/057* (2013.01); *G06T 2207/10016* (2013.01); *G06T 2207/10064* (2013.01); *G06T 2207/20081* (2013.01); *G06T 2207/30092* (2013.01)

(58) Field of Classification Search
USPC .......................................................... 382/103
See application file for complete search history.

(56) References Cited

U.S. PATENT DOCUMENTS

2013/0259341 A1* 10/2013 Mountney ............ A61B 5/0035
382/131
2013/0279780 A1* 10/2013 Grbic ................... A61B 5/0033
382/131

OTHER PUBLICATIONS

Tu, Zhuowen. "Probabilistic boosting-tree: Learning discriminative models for classification, recognition, and clustering." Tenth IEEE International Conference on Computer Vision (ICCV'05) vol. 1. vol. 2. IEEE, 2005.

Wang, Peng, et al. "Image-based co-registration of angiography and intravascular ultrasound images." IEEE transactions on medical imaging 32.12 (2013): 2238-2249.

Zheng, Yefeng, et al. "Four-chamber heart modeling and automatic segmentation for 3-D cardiac CT volumes using marginal space learning and steerable features." IEEE transactions on medical imaging 27.11 (2008): 1668-1681.

* cited by examiner

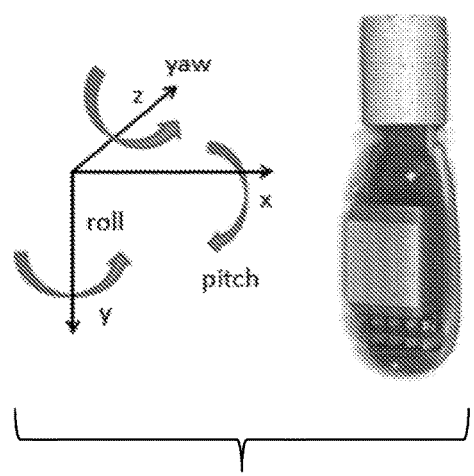
FIG. 3
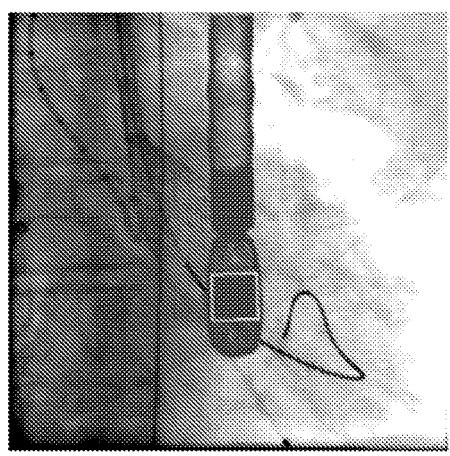 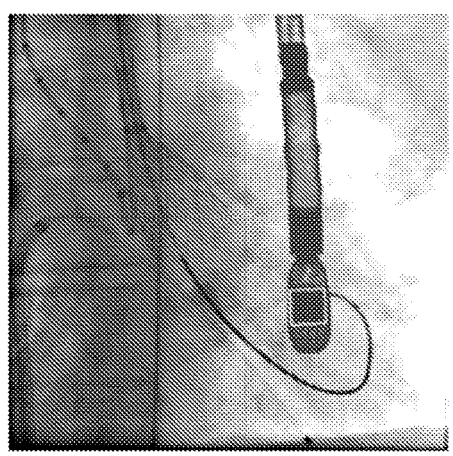
FIG. 4A          FIG. 4B

TRACKING FOR DETECTION OF TEE PROBE IN FLUOROSCOPY MEDICAL IMAGING

RELATED APPLICATIONS

The present patent document claims the benefit of the filing date under 35 U.S.C. § 119(e) of Provisional U.S. Patent Application Ser. No. 62/198,524, filed Jul. 29, 2015, which is hereby incorporated by reference.

BACKGROUND

The present embodiments relate to detection of a probe in fluoroscopy. 2D X-ray fluoroscopy is routinely used for interventional cardiac surgery. X-Ray fluoroscopy and transesophageal echocardiography (TEE) provide complementary information during the cardiac surgery. Fluoroscopy is used to monitor interventional devices (e.g., catheter and TEE probe), and 3D TEE is used to visualize soft tissue. To fully utilize complementary fused information from both modalities, the coordinate systems of the fluoroscopy and ultrasound are registered or aligned.

In one approach to align the coordinate systems, a learning-based detection finds a transform between the coordinate systems based on detection of a pose of the probe in a fluoroscopy image. The pose of the probe is separated into the in-plane and out-of-plane parameters. The in-plane parameters are computed from the probe's position, size, and orientation. Out-of-plane parameters are computed with template matching. In practice, single frame-based detection may have low accuracy due to probe appearance ambiguity in a given fluoroscopic image, low X-Ray dose, noise, and/or clutter.

BRIEF SUMMARY

By way of introduction, the preferred embodiments described below include methods, systems, instructions, and computer readable media for detection of a probe in fluoroscopy medical imaging. The pose of the probe through a sequence of fluoroscopic images is detected. The detection relies on an inference framework for visual tracking over time. By applying visual tracking, the pose through the sequence is consistent or the pose at one time guides the detection of the probe at another time. Single frame drop-out of detection may be avoided. Verification using detection of the tip of the probe and/or weighting of possible detections by separate detection of markers on the probe may further improve the accuracy.

In a first aspect, a method is provided for detection of a probe in fluoroscopy medical imaging. A fluoroscopy system scans a patient with the probe within the patient. The scanning provides a sequence of frames of data representing the patient and the probe over time. A first machine-learnt classifier detects a plurality of pose hypotheses for the probe from the frames of data. One of the pose hypotheses is selected for each frame of data with an inference framework using the pose hypotheses for others of the frames of data. The coordinates of the fluoroscopy system are aligned with the probe based on the selected pose hypothesis.

In a second aspect, a method is provided for detection in fluoroscopy medical imaging. A fluoroscopy system scans a patient with a transesophageal echocardiography probe within the patient. The scanning provides a sequence of frames of data representing the patient and the probe over time. A first machine-learnt classifier detects a plurality of first pose hypotheses for the probe from the frames of data. The first pose hypotheses are position, orientation, and scale in-plane with the frames of data. One of the first pose hypotheses is selected for each frame of data with a first inference framework considering the first pose hypotheses over time. For each of the selected one of the first pose hypotheses, a plurality of second pose hypotheses for the probe are detected from the frames of data by pattern matching. The second pose hypotheses are orientation out-of-plane with the frames of data. One of the second pose hypotheses is selected for each frame of data with a second inference framework considering the second pose hypotheses over time. A display is generated with a transesophageal echocardiography image from the probe and a fluoroscopy image from the fluoroscopy system aligned based on the selected ones of the second pose hypotheses.

In a third aspect, a system is provided for detection in fluoroscopy medical imaging. A transesophageal echocardiography imaging system includes a probe for imaging from within a patient. A fluoroscopy system is configured to acquire a sequence of fluoroscopic data representing the probe and the patient. An image processor is configured to detect a pose of the probe as represented in the fluoroscopic data. The detection of the pose includes visual tracking over the sequence.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 3 illustrates an example TEE probe;

FIGS. 4A and 4B show the example TEE probe at different out-of-plane orientations;

FIGS. 9A-D show fluoroscopy images of markers on the different sides;

DETAILED DESCRIPTION OF THE DRAWINGS AND PRESENTLY PREFERRED EMBODIMENTS

Visual tracking is used to detect a pose of a probe, such as an ultrasound transesophageal echocardiography probe pose, in x-ray fluoroscopy images. Fully automated tracking uses temporal information to more reliably detect the probe pose. The visual tracking is formulated as an inference framework, such as a sequential Bayesian inference framework. A stable probe pose at one time is used to initialize tracking of the pose over time.

In a previous approach for detection in any given single image, in-plane pose is detected with a machine-learnt classifier, and then out-of-plane pose is detected with template matching. In one embodiment of the current approach, the same process is used, but with various improvements. Instead of using steerable features for in-plane orientation and scale detection, rotated HAAR features are used. To improve template matching, a bootstrap-based approach detects both ball markers and hole markers positioned on the probe after detecting the probe in-plane position. To further smooth quantization errors, a Kalman filter is applied to the pose parameters. To detect tracking failure (e.g., drifting and/or stuck at local minima), automated tracking failure detection and tracking re-initialization approaches are provided. With the improvements of this approach in combination with visual tracking, the detection accuracy is improved.

Any one or more of the visual tracking and/or other improvements may be used in any embodiment for detecting the pose of the probe in one or more fluoroscopy images. An automated visual tracking-based pipeline for detecting TEE pose parameters is provided. A sequential Bayesian inference framework may provide close to or actual real-time or on-line tracking during surgery.

Figure 1:
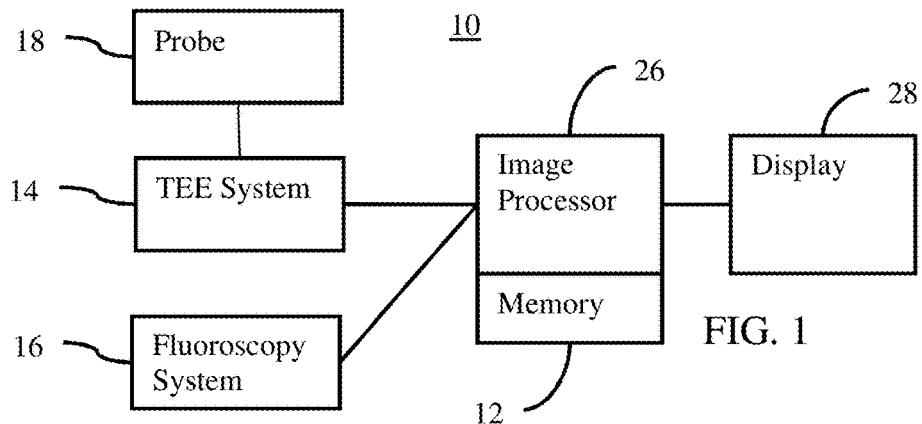
FIG. 1 is a block diagram of one embodiment of a system for detection in fluoroscopy medical imaging.

FIG. 1 shows a system 10 for detection of a probe in fluoroscopy medical imaging. The system 10 includes a memory 12, a transesophageal echocardiography (TEE) imaging system 14 with an image probe 18, a fluoroscopy system 16, an image processor 26, and a display 28. Additional, different, or fewer components may be provided. For example, a network or network connection is provided, such as for networking with a medical imaging network or data archival system. As another example, a preoperative imaging system, such as a computed tomography or magnetic resonance imaging system, is provided. In another example, a user interface is provided.

The memory 12, image processor 26 and/or display 28 are part of a medical imaging system, such as the fluoroscopy system 16, TEE imaging system 14, or other system. Alternatively, the memory 12, image processor 26, and/or display 28 are part of an archival and/or image processing system, such as associated with a medical records database workstation or server. In other embodiments, the memory 12, image processor 26, and/or display 28 are a personal computer, such as desktop or laptop, a workstation, a server, a network, or combinations thereof. The memory 12, image processor 26, display 28, and/or memory 12 may be provided without other components for implementing the method.

The memory 12 is a graphics processing memory, a video random access memory, a random access memory, system memory, random access memory, cache memory, hard drive, optical media, magnetic media, flash drive, buffer, database, combinations thereof, or other now known or later developed memory device for storing data or video information. The memory 12 is part of an imaging system, a computer associated with the processor 26, a database, another system, a picture archival memory, or a standalone device.

The memory 12 stores data representing a scan region, at different times, of a patient. The region is a two or three-dimensional region. The region is of any part of the patient, such as a region within the chest, abdomen, leg, head, arm, or combinations thereof. The data is ultrasound, fluoroscopic, and/or other image data. The data includes fluoroscopic information representing the probe 18 while the probe 18 is within the patient. The data may represent the patient without the probe 18.

The data is from scanning the region by any medical imaging modality. Any type of data may be used, such as medical image data (e.g., ultrasound, x-ray, computed tomography (CT), magnetic resonance imaging (MRI), or positron emission tomography). In one embodiment, the data representing the patient volume is ultrasound data and fluoroscopy data. The data represents the patient prior to, during, and/or after treatment. For example, the fluoroscopy data is acquired during treatment to guide positioning of the probe, and the ultrasound data is also provided during treatment to guide the treatment relative to the soft tissue of the patient.

Image data is data that can be used to generate an image, pixels values to be displayed, pixel values that were displayed, or other frames of data representing the region of the patient at a given time. The image data may be frames of DICOM data or frames of data generated along any portion of a data processing path of an imaging system. A sequence of frames of data is acquired, such as acquiring fluoroscopy images over two or more heart cycles at any frame rate (e.g., 10-20 frames per second).

The memory 12 alternatively or additionally stores candidate locations for the position, orientation, and/or scale of the probe 18 (hypotheses of probe pose) in the fluoroscopy frames. Any parameters, thresholds, machine-learnt classifiers, templates, probability maps, calculated results, selections, visual tracking information, and/or other calculated information for aligning the coordinate systems may be stored.

The memory 12 or other memory is alternatively or additionally a computer readable storage medium storing data representing instructions executable by the programmed processor 26 for detecting probe pose in a sequence of fluoroscopy images. The instructions for implementing the processes, methods and/or techniques discussed herein are provided on non-transitory computer-readable storage media or memories, such as a cache, buffer, RAM, removable media, hard drive or other computer readable storage media. Non-transitory computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The TEE imaging system 14 is a medical diagnostic ultrasound imaging system built for TEE or used for TEE. In alternative embodiments, the ultrasound system is for imaging with a catheter or other probe than a TEE probe 18.

Using ultrasound, the TEE imaging system 14 scans a plane and/or volume of the patient from the probe 18.

The probe 18 is an endocavity probe for insertion into the throat, other orifice, or in a surgical opening of the patient. In alternative embodiments, the probe 18 is a catheter for insertion into the circulatory system of the patient. External or handheld probes may be used in other embodiments. The probe 18 is positioned within the patient for ultrasound imaging. The scanning is performed using the probe 18 while the probe 18 is in the patient.

The fluoroscopy system 16 is any now known or later developed fluoroscopy system. The fluoroscopy system 16 includes an x-ray source and detector separated by a region into which the patient is positioned. Using a C-arm or other supporting structure, the source and detector are positioned relative to the patient. X-rays passing through the patient and the probe 18 while within the patient are detected.

By transmitting X-rays through the patient to the detector, a projection image is provided. Any tissue, bone, the probe 18, and/or other medical device along the path of travel of the X-ray beam interacts with the X-rays, causing a detectable difference in intensity at the detector. Since each pixel or location of the detector represents an accumulation of responses along the path of travel, the fluoroscopy image is a projection image of the region.

The fluoroscopy image is generated with response from the probe 18. For example, during surgery, the probe 18 may be positioned within the patient. One or more fluoroscopy images are generated in real-time during the procedure. A sequence of fluoroscopy images over multiple (e.g., three or more) heart cycles is acquired. The fluoroscopy image represents the patient and/or probe 18 in the patient for one or different phases in any one or multiple heart cycles. The frames of the fluoroscopy sequence are acquired and processed for detection within seconds of acquisition (e.g., real-time or on-line detection) or are stored and later retrieved for detection.

The image processor 26 is a general processor, central processing unit, control processor, graphics processor, digital signal processor, three-dimensional rendering processor, image processor, application specific integrated circuit, field programmable gate array, digital circuit, analog circuit, combinations thereof, or other now known or later developed device for detecting pose of the probe 18 and/or aligning coordinate systems of the TEE imaging system 14 and the fluoroscopy system 16. The image processor 26 is a single device or multiple devices operating in serial, parallel, or separately. The image processor 26 may be a main processor of a computer, such as a laptop or desktop computer, or may be a processor for handling some tasks in a larger system, such as in an imaging system. The image processor 26 is configured by instructions, design, hardware, and/or software to be able to perform the acts discussed herein.

Figure 2:
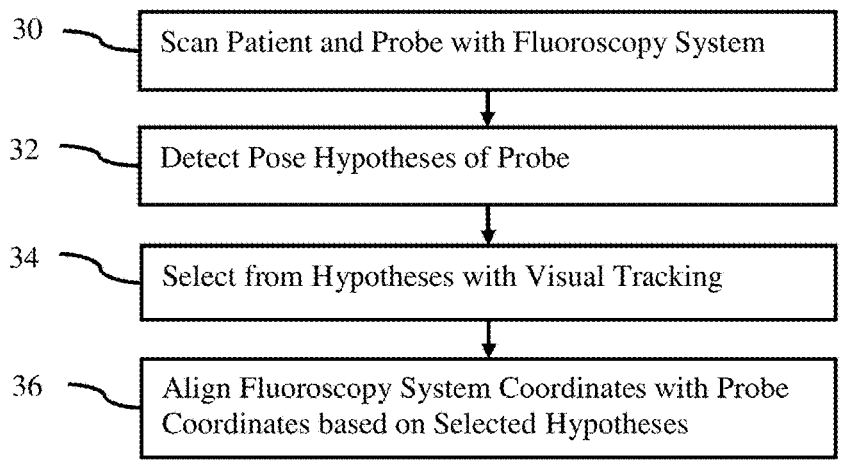
FIG. 2 is a flow chart diagram of one embodiment of a method for detection in fluoroscopy medical imaging.
Figure 6:
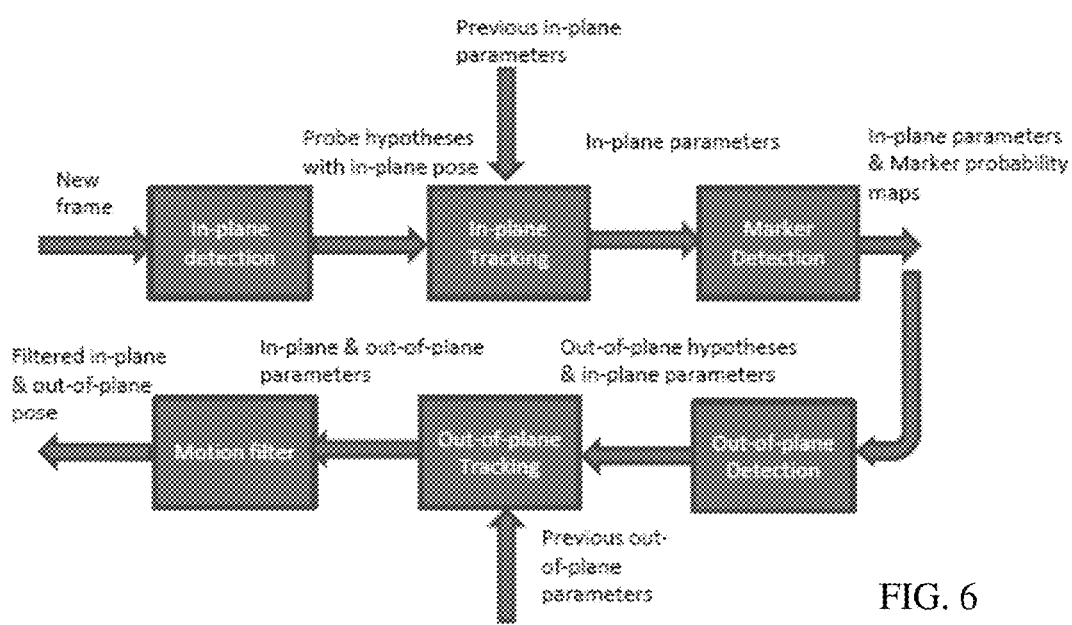
FIG. 6 is a flow chart of one embodiment of a method for detection in fluoroscopy medical imaging using the approach of FIG. 5 with visual tracking.
Figure 7:
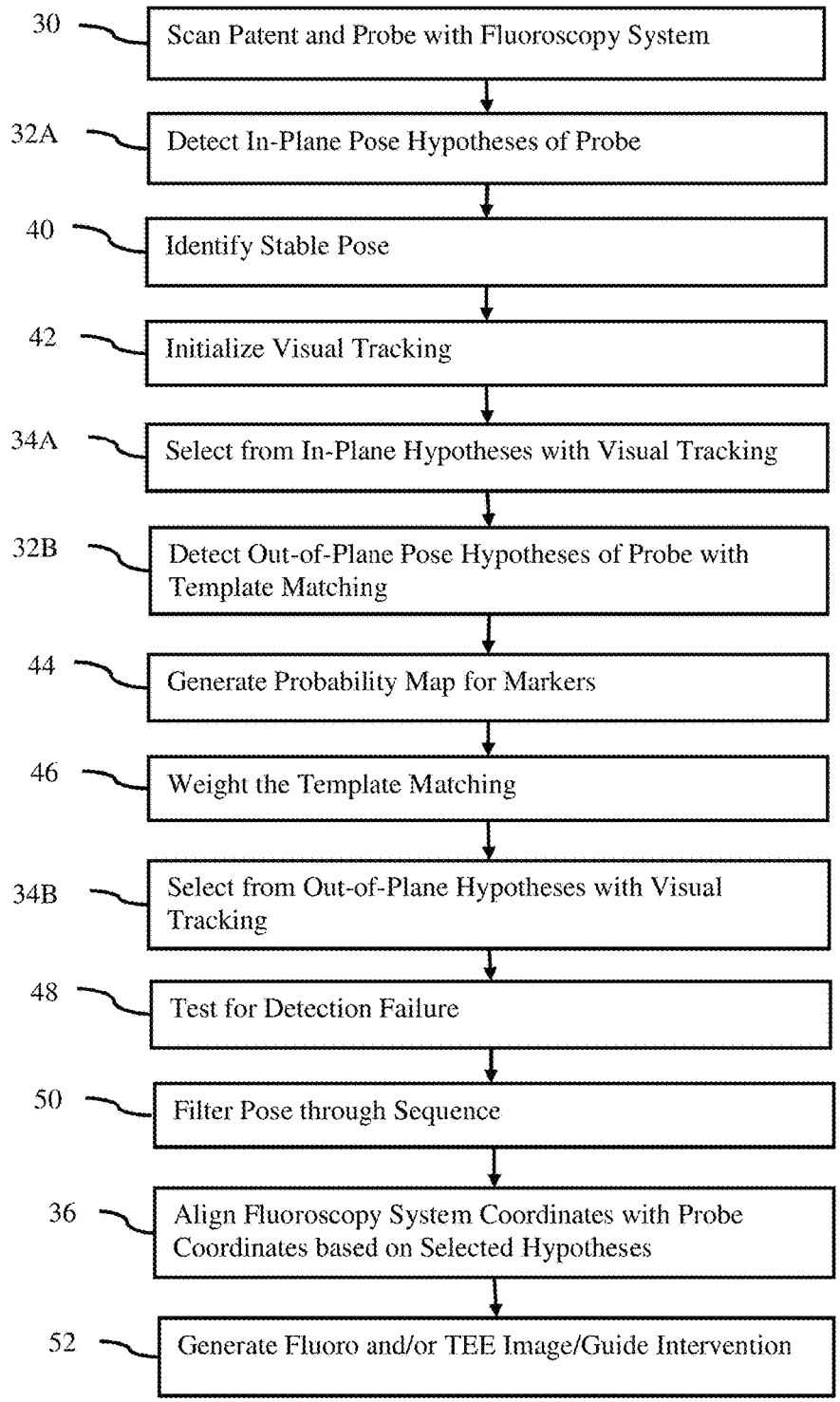
FIG. 7 is a flow chart of a further embodiment of the method of FIG. 6.
Figure 8:
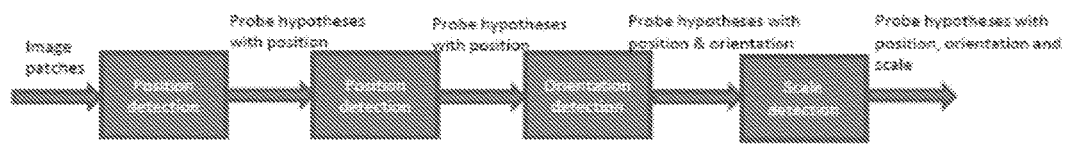
FIG. 8 is a flow chart of one embodiment for in-plane parameter detection.

The acts 32-36 of FIG. 2, acts 32-52 of FIG. 7, acts of FIG. 6, acts of FIG. 8, or sub-sets thereof are implemented by the image processor 26. As compared to the specifics of these Figures, the operation of the image processor 26 is now described in general. The image processor 26 is configured to detect a pose of the probe as represented in the fluoroscopic data. The detection of the pose includes visual tracking over the sequence. To initialize the visual tracking, the image processor 26 is configured to select a stable pose in one of the frames of data. A pose is detected. If the reliability of the pose is greater than a threshold, then the pose is used to initialize the temporal tracking to select the poses in other frames in the sequence. In one embodiment, a tip of the prove is detected and used to establish whether the detection is stable. The image processor 26 is configured to detect in-plane pose with machine-learnt classification, detect out-of-plane pose with template matching, and use visual tracking for one or both of in-plane and out-of-plane pose selection. In one embodiment, markers on the probe 18 are detected, and the detection is used to increase accuracy of the out-of-plane pose detection. The detection of the out-of-plane pose is weighted by the detection of the markers on the probe. Any of the other improvements, combinations of acts, and/or acts discussed herein may be implemented and/or controlled by the image processor 26.

The display 28 is a monitor, LCD, projector, plasma display, CRT, printer, or other now known or later developed devise for outputting visual information. The display 28 receives images, graphics, or other information from the image processor 26, memory 12, TEE system 14, or fluoroscopy system 16.

One or more fluoroscopy images representing a probe position relative to a patient region are displayed. The location of the medical device (e.g., probe 18) is or is not highlighted, marked by a graphic, or otherwise indicated on the image. For example, an image includes fluoroscopic information showing the location of a probe 18. Where a sequence of images is displayed, the location of the probe 18 is shown in each of the images. One or more ultrasound images may also be shown. The alignment or position of the ultrasound images relative to the fluoroscopy images is output, represented on the display, or incorporated into the displayed images. Alternatively, the ultrasound and fluoroscopy images are aligned and fused into one image (e.g., ultrasound image overlaid on part or all of the fluoroscopy images) using the alignment based on the identified pose.

FIG. 2 shows one embodiment of a method for detection of a probe in fluoroscopy medical imaging. The method is implemented by the system 10 of FIG. 1 or a different system. For example, the fluoroscopy system 16 performs the scan 30, and the image processor 26 performs the other acts 32-36.

The acts are performed in the order shown or a different order. Additional, different, or fewer acts may be provided. For example, FIGS. 6-8 show different combinations of acts. As another example, acts 32 and 34 are performed repetitively, such as once for in-plane parameters and another time for out-of-plane parameters. Alternatively, acts 34 and 34 are performed only once for in-plane, out-of-plane, or both in-plane and out-of-plane pose detection.

FIG. 2 represents one general approach to pose detection and alignment using visual tracking. The detection of pose is for one or both of in-plane and out-of-plane pose detection. Similarly, the visual tracking of the selection act 34 is for one or both of in-plane and out-of-plane pose detection.

In act 30, a patient and probe within the patient are scanned with x-rays. A fluoroscopy system scans the patient while the probe is inserted inside the patient.

In act 32, pose hypotheses are detected. The detected poses are in-plane, out-of-plane, or both. FIG. 3 shows an example probe and the three axes of rotation. The Euler angles (e.g., yaw, roll, and/or pitch) relative to the probe are represented in FIG. 3. Since the projection for fluoroscopy may be along a direction different than or the same as any of the probe axes, the orientation of the probe in the fluoroscopy frames or projection plane may be different than the Euler angles for the probe. In the examples discussed herein, yaw will be treated as in-plane and pitch and roll as out-of-plane orientation.

One or more possible poses are detected from a frame of fluoroscopy data. Given the noise, clutter, anatomy, other medical devices, or other information in the fluoroscopy frame of data, various possible probe poses may be found.

The detection is performed using any of various image processes. For example, a machine-learnt classifier is applied to the fluoroscopy frame of data to detect the pose. As another example, template matching is used to detect the pose.

For a given image, the out-of-plane orientation may be ambiguous. For example, FIGS. 4A and 4B show two fluoroscopy images of a probe where the rectangle on the probe is the ultrasound transducer. The probes are similar in appearance with similar in-plane orientation, but may have the same or different out-of-plane orientations. By just considering a single frame of fluoroscopy data or data representing the probe at one time, the image processing may fail to accurately determine the pose.

Act 34 of FIG. 2 applies visual tracking, using information across time, to select the pose from among the pose hypotheses. Including temporal consistency in pose detection through tracking may avoid incorrect pose determination or abrupt loss of probe detection. The visual tracking uses the pose for a previous frame or poses from previous frames to select the pose from pose hypotheses for a current frame. In other embodiments, pose hypotheses and/or selected poses from subsequent frames may be used to select for a current frame. By using the pose and/or pose hypotheses (e.g., previous selection of pose) from other frames, the likelihood of selecting the correct pose is increased. Given the rapidity of fluoroscopy scanning (e.g., 10-20 frames per second) and the relative slowness of change in pose of the probe, the visual tracking uses consistency or motion prior to increase accuracy of pose selection. For using pose from a different frame of data, an initial pose in an initial frame is selected without visual tracking. The initial pose and frame are selected using any criterion.

Any implementation of the visual tracking may be used. For example, an inference framework is used. Inference or other probabilistic approach may be used to select the pose hypotheses with the greatest likelihood of being correct.

The visual tracking is applied one or more times. Where in-plane and out-of-plane pose detection are applied separately or in sequence, the visual tracking may be applied to both separately or in sequence. Alternatively, the visual tracking is applied for one and not the other of in-plane and out-of-plane pose detection. In one embodiment, the visual tracking is applied once for detection of all the pose parameters (i.e., detect in-plane and out-of-plane orientation using one pass of image processing).

In act 36, the coordinates of the fluoroscopy system are aligned with the probe. The selected pose hypothesis is a pose of the probe relative to the fluoroscopy system. The pose provides a transform relating the two systems. The position of the ultrasound image in the coordinate system of the probe may be related to or aligned with the position of the fluoroscopy image in the coordinate system of the fluoroscopy system.

The alignment may be used to inform the physician of probe position relative to the patient and/or ultrasound image relative to the fluoroscopy image. The alignment allows for fusion of different types of images and/or indication of the spatial relationship (e.g., position, orientation, and/or scale) between the types of images.

Figure 5:
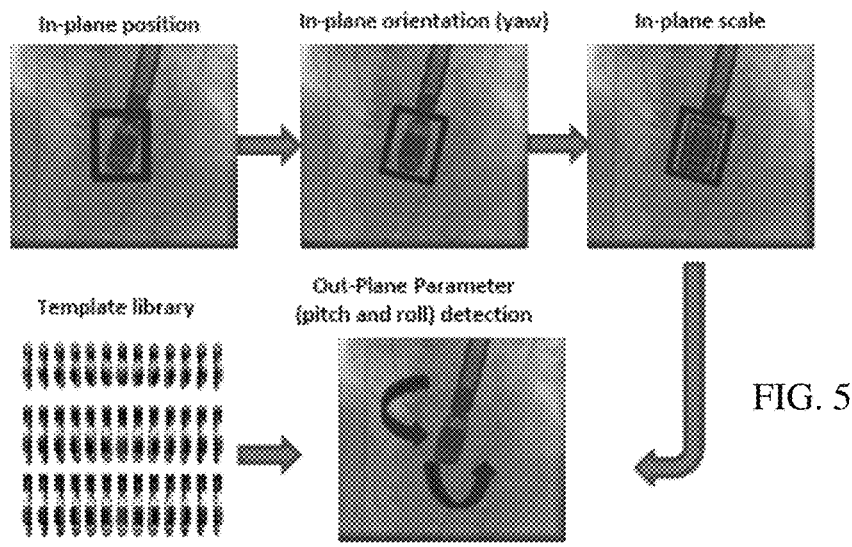
FIG. 5 shows an example detection of a probe using a cascade of in-plane classifiers and template matching for out-of-plane orientation.

An example implementation of the method of FIG. 2 is described below with respect to FIGS. 5-7. The visual tracking is implemented in an approach using separate or bootstrapped in-plane and out-of-plane pose detection. FIG. 5 shows the basic approach without visual tracking. For in-plane pose, the position, orientation, and scale are found sequentially. A cascade of machine-trained classifiers determines the in-plane pose. For out-of-plane pose, template matching is used. Templates representing the probe at different out-of-plane positions are correlated with the frame of data or a region of interest of the frame of data. The template with the greatest visual correlation indicates the out-of-plane pose. Different sets of templates may be provided for different in-plane poses, or one set of templates is used, but rotated based on the detected in-plane pose.

FIG. 6 shows the method of FIG. 5, but with various improvements. The image process pipeline is applied using a sequence of fluoroscopy frames of data. Visual tracking is provided for both in-plane detection (i.e., in-plane tracking) and out-of-plane detection (i.e., out-of-plane tracking). Marker detection is used to provide probability maps for the marker locations to weight the similarity or correlation scores for out-of-plane detection. A motion filter is applied to poses provided through the sequence of fluoroscopy images.

FIG. 7 shows one embodiment of the method of FIG. 6 with additional improvements to the method of FIG. 5. Additional, different, or fewer acts may be provided. For example, the acts represented in FIG. 6 are performed with or without any one or more of the additional acts of FIG. 7. As another example, visual tracking is applied to just in-plane or just out-of-plane pose estimation. In yet another example, acts 44 and 46, act 48, act 50, and/or act 36 are not provided.

The acts are performed in the order shown (top to bottom), but other orders may be used. For example, act 40 is performed prior to act 32A using position sensors. As another example, act 44 may be performed before any of the acts after act 30 and before act 46. In yet another example, act 46 is performed as part of act 32B.

The acts 30, 32, 34, and 36 common with FIG. 2 are the same acts as described for FIG. 2. The acts may be different.

In act 30, a fluoroscopy system scans a patient. The scan occurs while the probe is within the patient. The probe may also be used to scan the patient, such as with ultrasound. For pose detection, the frames of data from the fluoroscopy system are used.

X-rays are transmitted into the patient. A detector detects the intensity of the x-rays. Based on the propagation through the patient and/or probe, the x-rays at different locations (e.g., pixels on the detector) are subjected to different amounts of attenuation. The detector represents a projection plane for fluoroscopy detection.

The scanning is repeated any number of times at any rate. For example, a sequence of frames representing the patient and probe at different times is acquired. The sequence is acquired at 10-20 frames per second, but may have a different rate. The sequence is acquired over seconds or minutes.

In act 32A, an image processor applying a machine-learnt classifier detects a plurality of pose hypotheses for the probe from the frames of data. Any number of machine-learnt classifiers may be used. Any type of machine-learning may be used, such as neural network, Bayesian network, marginal space, or others. Any type of image features may be used, such as steerable features, Haar-wavelets, deep learnt, and/or others.

The pose hypotheses are for in-plane pose. The position, orientation, and scale in the projection plane of the fluoroscopy frame is detected. In other embodiments, scale is not detected. The in-plane pose parameters may be detected together or separately.

FIG. 8 shows one embodiment of pose detection with separate bootstrapped in-plane pose parameter detection. A cascade of classifiers detects the position, orientation, and scale. A plurality of pose hypotheses is output by the classification for the in-plane pose parameters. m in-plane hypotheses $\{c_i|i=1, 2 \ldots, m]$ with in-plane parameters are estimated using marginal space learning. A series of cascaded classifiers are trained to detect the position (u; v), size s, and orientation $\theta_z$ of the TEE probe in a fluoroscopic image. These classifiers are trained sequentially using bootstrap. The hypotheses are detected for (u; v), then $\theta_z$, and then s. The hypotheses from position are used as inputs to the orientation, and the hypotheses from orientation are used as inputs to scale.

Each classifier in the cascade is trained using Probabilistic Boosting Tree (PBT) with Haar-like features and/or rotated Haar-like features. For implementing the rotated Haar-like features, the frames may be rotated.

For detecting in-plane parameters in one embodiment, the image is rescaled to a pixel size 0.4 mm, but other or no rescaling may be used. The position classifier is trained on ground truth and negative samples taken randomly from the images. The patch size used for Haar-like feature generation is 90×90 pixels, but other sizes may be used.

As shown in FIG. 8, the first position detection classifier feeds to another position classifier. For the position detection, this other bootstrapped position classifier is trained using outputs from the initial position classifier. The negative samples for the bootstrapped position classifier are from both false detection of the first position detector and randomly sampled from the image.

The orientation detector is trained on rotated images in terms of ground truth probe orientations. The Haar-like features are computed on rotated images. The image rotation quantization step is five degrees with 360-degree coverage, but other step sizes and range of coverage may be used. The orientation detector is a bootstrapped classifier of the position detector.

For the scale detector, scaled Haar-like features are computed on rotated images. The scale factor is computed based on a mean probe size estimated from all the training images. The scale detector is a bootstrapped classifier of the orientation detector. The results or output of the scale detector is m in-plane hypotheses with in-plane pose parameters (u, v, $\theta_z$, and s).

In one embodiment to make the in-plane parameter detection invariant to different probe scale (e.g., the 90×90 image patch for feature computation may not cover all the TEE probe scale in practice), a hierarchical image pyramid with different patch sizes is used. The image pyramid provides the frames and patches scaled to different sizes or resolution. The classifier or different classifiers for different levels are trained to detect at the respective levels in the hierarchal pyramid for the frame of data. At each level of the pyramid, an in-plane parameter detector is trained. Alternatively, one detector for application to all or multiple of the levels is used. The detected hypotheses are aggregated across the multiple levels. To aggregate, an average across the levels is used.

Referring again to FIG. 7, a pose is identified for an initial frame in act 40. The initial frame may be any frame in the sequence, not necessarily the first. The identified pose is a most likely or stable pose to be used for visual tracking. For example, the machine-learned classifiers are applied and output a probability with each hypothesis. The hypothesis with the greatest probability is selected as the pose for the initial frame in the visual tracking. In other examples, a sensor, user selection, or other criterion is used to identify a stable pose without application of the machine-learnt classifiers or detectors.

In one embodiment, the pose for the initial frame is identified by clustering and/or aggregation. A cluster with more hypotheses may indicate a more stable pose amongst the hypotheses. An aggregate of multiple hypotheses may be more stable. The cluster and/or aggregate may be for one frame or across frames. For example, a final detection result is obtained by clustering and aggregating all in-plane detection hypotheses. Any clustering is used, such as non-maximal suppression. The cluster with the greatest number of hypotheses or maximal likelihood is selected. For aggregating, a weighted average or other combination of the hypotheses in proximity to the corresponding cluster center is calculated. Distance from the center of the cluster may be used to more heavily weight hypotheses in the center of the cluster in the aggregation.

In another embodiment, a stable pose is identified using standard deviation and a running window of frames. The window is shifted through the sequence of frames until the stable pose is identified. By applying machine-learnt in-plane pose detectors, pose hypotheses are generated on $N_i$ (e.g., $N_i$=5) consecutive frames. A median pose is found among the $N_i$ detection results. A weighted mean pose is computed in terms of detection pose hypotheses' proximity to the median pose. Any mapping of weight to proximity may be used. The standard deviation $\sigma_p$ to the mean pose is computed. The orientation distance is computed in the quaternion space. When $\sigma_p < \sigma_{threshod}$, the tracking algorithm is automatically started and the mean pose is utilized as the initial pose for one of the frames.

The stable pose may be verified prior to initialization. As part of providing the stable pose, a check is performed. Any check may be used, such as user input confirmation, detection of markers or a fit of a template to the pose. In one embodiment, a separate machine-trained classifier is applied to a region including the identified pose. The separate machine-trained classifier detects the tip or other distinctive features of the probe in the region of the frame. The tip detector is a classifier with three cascaded position detectors instead of the two of the probe position detector of FIG. 8. Other numbers of detectors may be used. The same or different features and training are used. The latter detectors are bootstrapped to the output of one or more earlier detectors. The probe tip has a salient feature and the probe position should be in proximity of probe tip.

Using distance between the probe tip and the detected pose, a reliability of the pose detection is provided. If this distance is below a threshold, then the pose selection for initialization passes. In this way, false positive of clustered hypotheses may be removed. The probe tip detector may improve the detection accuracy.

In act 42, the image processor initializes the visual tracking with the stable pose. The stable pose is assigned to the initial frame. The inference framework of the visual tracking is initialized by starting at that initial frame and treating the stable pose as a correct starting position. Where aggregation is applied across frames, the poses from multiple frames are combined (e.g., average from 5 poses of five frames) and the resulting pose is used to initialize the tracking (e.g., start tracking from sixth frame).

In act 34A, the image processor applies visual tracking. Using pose hypotheses across time or frames improves the selection of a pose from the hypotheses for each time or frame. The image processor selects one of the pose hypotheses for each frame of data using the pose hypotheses for one or more other of the frames of data. One of the pose hypotheses is selected for each frame of data with a first inference framework considering the first pose hypotheses over time. In one approach, one pose hypothesis in the form of previously selected or stable pose is used. A pose from the temporally adjacent or immediately previous frame is used to select from amongst the pose hypotheses of a current frame. In other approaches, the visual tracking uses multiple hypotheses from any number of frames to select a sequence of hypotheses providing a consistent and probable pose over time.

The selection uses an inference framework. For example, a Bayesian inference network with a maximum a posterior solution is used. Other inference networks and/or solutions may be used.

The visual tracking is initialized. Any of the approaches for initialization discussed above may be used. For out-of-plane visual tracking, one example approach is clustering or aggregation. Another example approach uses the standard deviation of a mean of a median pose.

In one embodiment, the visual tracking component is used to find the best in-plane parameters from detected hypotheses. In addition, in-plane hypotheses are only generated in a region of interest (ROI) defined by previous in-plane pose. The ROI is of any size, such as ⅓ of the overall image or frame, centered at previous probe position. Within that ROI, maximum a posterior (MAP) and a Bayesian inference network are used to find the pose. This is represented as:

$$P(M_t | Z_t) \propto P(M_t) P(Z_t | M_t),$$

$$\widehat{M_t} = \underset{M_t}{\mathrm{argmax}}\, P(M_t | Z_t)$$

where $M_t$ is in-plane pose parameters (u, v, $\theta_z$, s) after clustering, $\hat{M_t}$ is the optimal solution using maximum a posterior probability, $P(Z_t|M_t)$ is a likelihood of an in-plane hypothesis being the TEE probe in-plane candidate, and $P(M_t)$ is an in-plane motion prior probability. The prior probability is defined as a joint Gaussian distribution with respect to prior detected pose (u; v; $\theta_z$; s) of the previous frame with standard deviations ($\sigma_u$, $\sigma_v$, $\sigma_{\theta z}$ and $\sigma_s$).

To further improve orientation accuracy and minimize quantization error, in one embodiment, all detected in-plane hypotheses in proximity (any threshold distance) of the optimal solution $\hat{M_t}$ are found, and then a weighted mean of the orientation is re-computed based on angle distance to $\hat{M_t}$. In some embodiments, similar to orientation refinement, position and/or scale may also re-computed. In alternative embodiments, refinement is not provided in any one or more of orientation, position, and scale. In other embodiments, $M_t$ is the detected hypotheses before clustering. In such embodiment, position and scale are re-computed. Other refinements may be used.

In act 32B, the image processor detects out-of-plane orientation. After the selection of act 34A, a pose is provided for each frame. In act 32B, a plurality of out-of-plane hypotheses are detected for each of those poses. The angles defining the orientation of the pose out of the plane represented by the detection or projection plane in the frames are determined.

The orientation detection is based on template matching, but other processes may be used. A plurality of patterns is matched to the fluoroscope data at the detected in-plane pose. Each pattern represents a probe at a given orientation projected to the plane. Any step size for the patterns may be provided, such as 5 degree steps.

In one embodiment, in-plane parameters are utilized to transform probe image patches to a canonical coordinate system. The image patches are centered at the probe position with zero yaw angle. Templates in the library are in the same canonical coordinate system.

To make a robust out-of-plane parameter detection, in-plane results (position and yaw orientation) are augmented to generate more hypotheses. The in-plane pose is rotated, scaled, and/or translated to generate further hypotheses. In alternative embodiments, augmentation is not used.

Template matching search is applied on every hypothesis. Any measure of similarity may be used. For example, a minimum sum of absolute differences is used. As another example, a cross-correlation is used. Each template representing a different out-of-plane projection of the probe to the plane is pattern matched with each hypothesis. The level of matching is measured.

Figure 11:
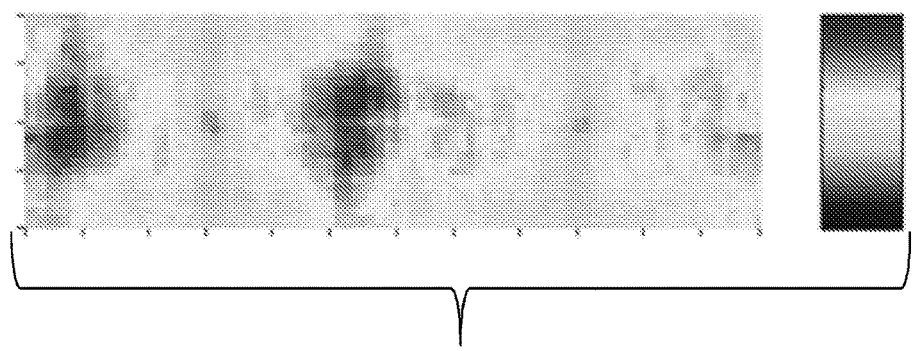
FIG. 11 shows a map of template matching scores.

FIG. 11 shows one example of a template matching response map. The x-axis is roll angle from −180 to 176 degrees, the y-axis is pitch angle from −51 to 52 degree. Each pixel represents the match score for one template pose. Dark indicates a high matching score and light indicates a small matching score. There are two dominant symmetrical modes, represented by the two clusters of higher scores around roll of −180 to −120 and −50 to 0 degrees.

The scores of each cluster are averaged and the highest average is selected. The average out-of-plane orientation of the selected cluster is selected as the out-of-plane orientation. Other approaches may be used.

Figure 9A:
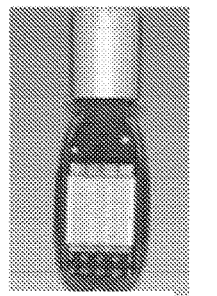
FIGS. 9A-D show markers on different sides of a probe.
Figure 9B:
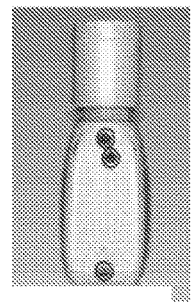
Figure 9C:
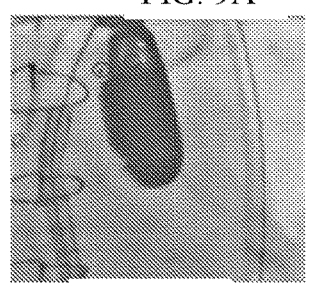
Figure 9D:
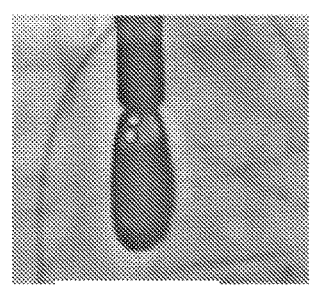

In embodiment, one or more markers on the probe are used to resolve the symmetrical mode. In one embodiment, three balls and three or holes are manufactured on the TEE probe. Other numbers and/or types of markers may be used. FIG. 9A shows three protruding balls on the probe, and FIG. 9B shows three indented holes on the probe. In fluoroscopic images, ball markers appear as black dots (see FIG. 9C showing two ball markers) and hole markers appear as white dots (see FIG. 9D showing two hole markers).

The markers are detected from the fluoroscopy data to generate a probability map in act 44. A machine-learnt classifier detects the markers and provides a probability associated with the detection. Any feature and/or type of machine learning may be used. In one embodiment, two marker detectors are used: one for detecting ball markers and the other one for detecting hole markers. Both detectors are two cascaded position classifiers (e.g., probabilistic boosting tree (PBT) classifiers using Haar-like features) with bootstrap training. In one embodiment, the image is rescaled to a pixel size 0.25 mm due to the size of the markers. The image patch for generating ball marker Haar-like features is 8×8 pixels. The image patch for generating hole marker Haar-like feature is 19×19 pixels. Other size feature kernels may be used. The marker detection is applied on a ROI which is 160×160 pixels centered at the in-plane probe position, but other ROI sizes may be used. The detection results are those clustered positions of detected marker hypotheses.

The output of the marker classification is a probability of each pixel of the region of the frame of data being a marker on the probe. Probability maps of ball markers and hole markers are computed based on detected clusters, which represent a pixel belonging to ball marker position and hole marker position respectively. The probability maps are derived in the following equations:

$$\tilde{D}(x) = \sum_{i=1}^{m} \exp(-|p_x - p_i|/\sigma_m),$$

$$D(x) = \frac{P_{mmax}\tilde{D}(x)}{\max_{x \in ROI} \tilde{D}(x)}$$

where $p_x$ is a pixel in a marker ROI and $p_i$ is the $i^{th}$ marker cluster's position, |.| is a distance between $p_x$ and $p_i$, $\sigma_m$ is a standard deviation, and $P_{mmax}$ is the maximal detection probability among all detected marker clusters. Both hole marker and ball marker use $sigma_m=2.0$ pixels, but other number of pixels may be used.

Figures 10A, 10B:
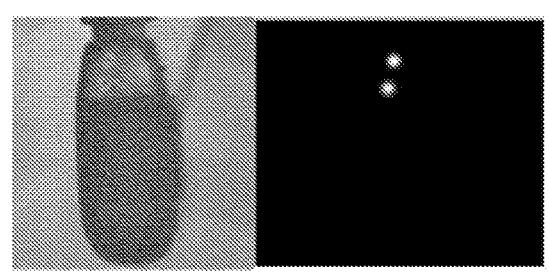
FIGS. 10A and 10B show example detection of markers and an example probability map for the detection.

FIG. 10A shows an example of a hole marker detection, and FIG. 10B shows a probability map based on the detection. A brighter pixel indicates higher probability that a pixel belongs to a hole marker. The center of the marker likely has a highest probability in the probability map.

The probability map or maps from the marker detection are used to weight the pattern matching of the out-of-plane orientation in act 46. By weighting the similarity scores by the marker probability, the symmetry of the template matching score may be reduced. In alternative embodiments, the marker detection is used to provide an independent orientation, such as based on a distribution and distance of the markers from each other. The orientations from the template matching and from the markers are averaged.

In one embodiment using the probability map to weight the pattern matching, the pattern matching score (e.g., correlation) is calculated as:

$$\widehat{T_{score}} = \frac{T_{score}}{N} \sum_{i=1}^{N} \alpha + p_i(x_i, y_i)$$

where $T_{score}$ is a template matching score, $p_i$ is $i^{th}$ markers probability obtained from corresponding marker probability map, $(x_i, y_i)$ is the marker position of the template, N is the number of markers, and $\alpha$ is a constant value of 0.5. Other constant values or weighting functions may be used. In terms of this weighting function, the template matching score is weighted based on marker detection confidence. A weighted score is provided for each out-of-plane pose hypothesis. The weighting is for template matching with each template including marker positions. The positions in the real image used to generate the marker probability map are verified to have markers using x and y as the in-plane image coordinates.

In act 34B, the image processor selects one of the pose hypotheses for each frame of data. The out-of-plane pose is selected using visual tracking. The pose hypotheses for one or more others of the frames of data are used to select a pose for each frame, such as described above for act 34A. A stable or previously selected pose hypothesis from one frame is used to select the pose hypothesis for another frame. The pose hypotheses over time are used to select for each given time. The selection uses an inference framework, such as a Bayesian inference network with a maximum a posterior solution.

In one embodiment, the top $M_o$ template matching results after weighting by marker detection are selected. The tracking algorithm finds the "best" hypothesis, as represented by:

$$P(N_t | X_t) \propto P(N_t)P(X_t | N_t),$$

$$\widehat{N_t} = \underset{N_t}{\mathrm{argmax}}\, P(N_t | X_t)$$

where $N_t$ is out-of-plane pose parameters $(\theta_x, \theta_y)$, $\widehat{N_t}$ is the optimal solution using maximum a posterior probability, $P(X_t|N_t)$ is likelihood of an out-of-plane hypothesis being TEE probe out-of-plane candidate, and $P(N_t)$ is an out-of-plane motion prior probability. The prior probability is defined as a joint Gaussian distribution with respect to prior detected pose $(\theta_x, \theta_y)$ of the previous frame with standard deviations $(\sigma x, \sigma_y)$.

To minimize quantization error due to discrete generation of templates and augmented in-plane hypotheses for template matching, post-processing is applied. In other embodiments, different or no post processing is used. For post processing, $N_o(\ll M_o)$ hypotheses are found in proximity of $\widehat{N_t}$ in terms of in-plane parameters $(u, v)$, and $\theta_z$ and out-of-plane parameters $\theta_x$ and $\theta_y$. A weighted average among the $N_o$ hypotheses provides a new $(u, v)$, $\theta_z$, $\theta_x$ and $\theta_y$ in terms of every detected hypothesis' distance (e.g., Euclidean) to $\widehat{N_t}$. This approach uses the closest N hypotheses to provide a new optimal solution.

The output is a pose for each frame. One pose is provided per frame. The pose includes in-plane and out-of-plane parameters, such as position, orientation, and scale in three-dimensions. Fewer than all of these parameters may be provided.

In act 48, the detection of the pose is tested. The image processor performs the test automatically or without user input. A score for the template matching of the selected out-of-plane pose parameters is compared to a threshold. Any threshold may be used. In other embodiments, probabilities from marker detection, in-plane pose parameter probabilities, and/or other information are used in addition to or as an alternative to the out-of-plane matching score.

In one embodiment, failure of the visual tracking is tested. $N_f$ (e.g. $N_f$=5) tracking results from a corresponding number of frames are used. The average matching score $m_{score}$ is computed. The matching scores being averaged may be the marker detection weighted scores or the scores without marker detection weighting. If $m_{score} < m_{threshold}$, the tracking is stopped and the initialization procedure is begun again. The procedure begins at act 32A, 32B, or 34B. As long as the visual tracking in the form of the score of the output pose is sufficiently high, the detecting and visual tracking continues as subsequent frames are acquired and/or processed. If failure is detection, the system automatically resumes tracking once detection become stable again.

In act 50, the output poses over time are filtered. The selected pose hypotheses of each frame are motion filtered. A Kalman filter (e.g. linear Kalman filter) smooths motion. The filtering is applied to the TEE probe pose (e.g., both in-plane and out-of-plane parameters). The filtering may be applied differently or not at all to some of the pose parameters as compared to others of the pose parameters.

In one example validation, 32 x-Ray fluoroscopic videos (1930 frames) are acquired from clinical experiments. The image size is 1024×1024 pixels. Computations of the detection and visual tracking of FIG. 7 are performed on a workstation with Intel Xeon (E5-1620) CPU 3.7 GHz and 8.00 GB Memory. On average, the detection and visual tracking on this workstation uses every frame up to 10 frames per second, so real-time or on-line detection and tracking is provided. Other workstations or using a sub-set of acquire frames may provide real-time operation at greater frames per second.

Detection and tracking accuracy are evaluated by calculating the standard target registration error (3D TRE) and 2D TRE. 2D TRE is a target registration error where z axis (depth) of the projected target point is not considered when computing distance error. Table 1 shows percentage of successful cases under certain TRE limits, given as a distance from accurate. The numbers in the table show percentage of successful cases under different TRE error categories. Two methods represented in FIG. 7 are tested, detection without visual tracking and detection with visual tracking.

| Method | 3D TRE <10 mm | 3D TRE <5 mm | 2D TRE <5 mm | 2D TRE <2.5 mm |
|---|---|---|---|---|
| Detection w/o Visual Tracking | 97.10% | 69.77% | 90.42% | 55.54% |
| Detection w/ Visual Tracking | 99.59% | 87.73% | 95.50% | 74.33% |

The visual tracking improves accuracy of pose determination.

In act 36, the poses over time are used to align the coordinates of the fluoroscopy system with the probe over-time. The alignment occurs for each time. Alternatively, an average transform is calculated and used for subsequent registration or conversion.

The pose of the probe in each frame of fluoroscopy data provides the spatial relationship between the fluoroscopy system and the ultrasound system of the probe. In one embodiment, a 3D point $Q_{TEE}$ in the ultrasound coordinate system is projected in the fluoroscopic image at 2D image point $Q_{Fluoro}$. The relationship is represented as:

$$Q_{fluoro}=P_{int}P_{ext}(R_{TEE}^{W}Q_{TEE}+T_{TEE}^{W})$$

where $P_{int}$ is fluoroscope or camera internal projection matrix, $P_{ext}$ is fluoroscope camera external matrix that transforms a point from a world coordinate to camera coordinate system. The internal and external relate the movable C-arm mounted x-ray and detector space to the world space of the fluoroscopic system. The internal and external matrices are known from calibration and C-Arm rotation angles. The ultrasound system, including the probe, are also defined in the world space. $R_{TEE}^{W}$ and $T_{TEE}^{W}$ are the rotation and position of the TEE probe in the world coordinate system. $R_{TEE}^{W}$ and $T_{TEE}^{W}$ are computed from:

$$R_{TEE}^{W}=P_{ext}^{-1}R_{TEE}^{C}$$

$$T_{TEE}^{W}=P_{ext}^{-1}T_{TEE}^{C}$$

where $R_{TEE}^{C}$ and $T_{TEE}^{C}$ are the rotation and position of the TEE probe in the fluoroscopic coordinate system. $R_{TEE}^{C}=(\theta_z, \theta_x, \theta_y)$ (see FIG. 3 illustrating these Euler angles), and $T_{TEE}^{C}=(x; y; z)$. By detection of the pose, the relationship may be determined.

In act 52, the image processor generates a fused image from one of the frames of data from the fluoroscopy system and an image generated using the imaging probe. Using the alignment, the spatial locations represented by one type of imaging are transformed to coordinates of another type of imaging. This alignment may be used to create a display with two types of images shown side-by-side. The perceived relative positioning is based on the alignment, helping the viewer understand the relationship. Alternatively or additionally, one type of imaging is transformed into the coordinates of another type and overlaid. For example, a fluoroscopy image is displayed as a gray-scale image. For a region in the image, ultrasound data replaces the fluoroscopic data or the fluoroscopic data is overlaid by an ultrasound image. The ultrasound image may be in color. Any now known or later developed display of images from two types of imaging using relative alignment may be used. In other embodiments, the detected probe may be highlighted in an image, such as by modulating the brightness, overlaying a graphic of the probe, or coloring the pixels of the probe.

As an alternative to fused imaging or as a use for fused imaging, the coordinate systems of the two systems (e.g., x-ray and ultrasound) are aligned. Landmarks selected by a physician in the ultrasound (3D) are transferred or relatable to an x-ray image (2-D). Those overlaid landmarks are bio-markers guiding the physician during intervention. While fusion may not occur, the images from both types of imaging and the coordinate alignment assist in guiding the physician.

Tracking or determining the relative alignment over time and communicating that alignment provides the confidence that the probe detection is working robustly. Abrupt failed probe detection is not good especially when the probe does not move. A detection alone-based approach is not able to address abrupt failures due to disturbance, noise and appearance ambiguities of the probe. Including the visual tracking utilizing temporal information to detect probe pose in fluoroscopic images may avoid abrupt detection failure and improve detection robustness. A near real-time (about 10 FPS) and fully automated approach including both automated tracking initialization and tracking re-initialization when tracking failure is detected may provide the physician with more information for surgery and during the surgery.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for detection of a probe in fluoroscopy medical imaging, the method comprising:
    scanning, with a fluoroscopy system, a patient with the probe within the patient, the scanning providing a sequence of frames of data representing the patient and the probe over a period of time, wherein each frame of data of the sequence of frames of data corresponds to a respective given time of the period of time;
    detecting a plurality of pose hypotheses for the probe for each frame of data of the frames of data;
    selecting one of the pose hypotheses for each frame of data with an inference framework using the pose hypotheses for others of the frames of data; and
    aligning coordinates of the fluoroscopy system with the probe based on the selected pose hypothesis.

2. The method of claim 1 wherein detecting comprises detecting position, orientation, and scale in a cascade of a first machine-learnt classifier for each pose hypothesis, the position, orientation, and scale being in-plane of the frames.

3. The method of claim 1 wherein detecting comprises detecting out-of-plane orientation based on template matching.

4. The method of claim 3 further comprising generating a probability map for markers on the probe with a machine-learnt classifier applied to the frames of data and weighting the template matching with the probability map.

5. The method of claim 3 further comprising testing for detection failure based on comparison of a score for the template matching to a threshold.

6. The method of claim 1 wherein selecting comprises selecting with the inference framework comprising a Bayesian inference network with a maximum a posterior solution.

7. The method of claim 1 wherein selecting comprises selecting the one pose hypothesis for each frame of data corresponding to a respective given time of the period of time based on the pose hypotheses for other times of the period of time.

8. The method of claim 7 further comprising filtering the selected pose hypotheses over the period of time.

9. The method of claim 1 further comprising:
identifying a pose for an initial frame; and
initializing the selecting with the inference framework with the pose for the initial frame.

10. The method of claim 9 wherein identifying the pose comprises:
detecting the pose with a first machine-trained classifier;
detecting a tip of the probe with a second machine-trained classifier; and
verifying the pose based on the detected tip.

11. The method of claim 9 wherein identifying the pose for the initial frame comprises detecting pose results for a plurality of the frames, calculating a mean of a median of the pose results, and comparing a standard deviation from the mean to a threshold.

12. The method of claim 1 wherein detecting comprises detecting at multiple levels in a hierarchal pyramid for the frames of data and aggregating results of the multiple levels.

13. The method of claim 1 wherein the probe comprises an imaging probe, and further comprising generating a fused image from one of the frames of data from the fluoroscopy system and an image generated using the imaging probe.

* * * * *